June 30, 1953  F. BOEHM  2,643,546
PROTECTIVE CAGE STRUCTURE FOR TUBULAR GAUGES
Filed Dec. 6, 1949  3 Sheets-Sheet 1

Inventor:
Frederick Boehm
by his Attorneys
Howson &
Howson

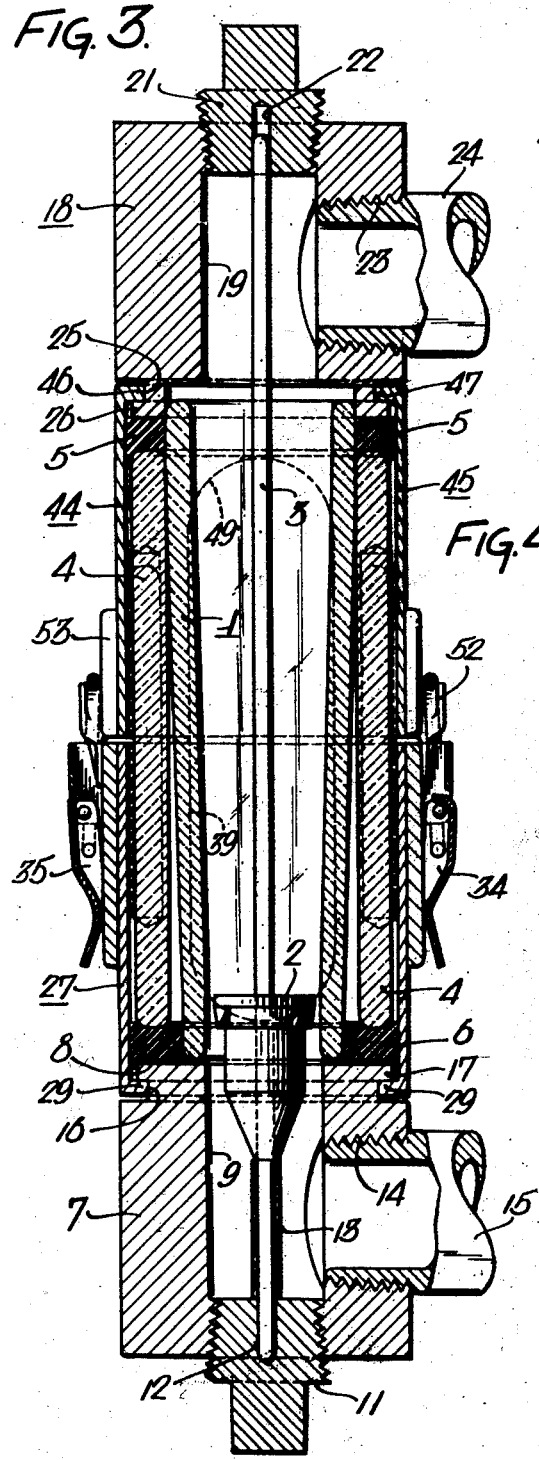

June 30, 1953  F. BOEHM  2,643,546
PROTECTIVE CAGE STRUCTURE FOR TUBULAR GAUGES
Filed Dec. 6, 1949  3 Sheets-Sheet 3

Inventor:
Frederick Boehm
by his Attorneys
Howson &
Howson

Patented June 30, 1953

2,643,546

UNITED STATES PATENT OFFICE 2,643,546

PROTECTIVE CAGE STRUCTURE FOR TUBULAR GAUGES

Frederick Boehm, Philadelphia, Pa., assignor to Schutte & Koerting Co., Philadelphia, Pa., a corporation of Pennsylvania Application December 6, 1949, Serial No. 131,311

5 Claims. (Cl. 73—209)

This invention relates to improvements in rotameters and a primary object of the invention is to provide a generally improved assembly having a number of novel and desirable structural characteristics hereinafter set forth.

A more specific object of the invention is to provide a rotameter assembly having inlet and outlet elements independently adjustable through angles of 360 degrees about the axis of the flow tube so as to afford a high degree of flexibility in the attachment of the rotameter assembly to the associated pipe system.

Another object of the invention is to provide an assembly which includes an outer transparent tubular casing for the flow tube as a protection for the latter.

Another object of the invention is to provide an assembly which includes an armored cage or jacket constructed so as to facilitate assembly and disassembly of the rotameter.

Still another object of the invention is to provide an assembly wherein the aforesaid protection tube and armored cage constitute functional elements of a packing gland which form sealed connections between the opposite ends of the flow tube and the inlet and outlet fittings.

A further object of the invention is to provide a rotameter assembly including an armored cage or jacket as aforesaid which includes as an element of the cage or jacket structure means for holding the assembly together, said means being of a character to afford quick engagement and release to facilitate assembly and disassembly of the rotameter parts.

A still further object of the invention is to provide a rotameter assembly wherein tie-rods or other threaded fastenings are eliminated.

Still another object of the invention is to provide an assembly including an outer frame in the form of an armored cage or jacket which may be produced from bar stock and which thereby avoids the need for castings.

The invention also contemplates an assembly which is adaptable either to the use of guide rods for the float element of the rotameter or to tubes of the type wherein the guide means is an integral part of the flow tube structure.

The invention resides also in certain novel structural details and devices hereinafter devices hereinafter described and illustrated in the attached drawings, wherein:

Fig. 3 is a longitudinal sectional view of the assembly illustrated in Figs. 1 and 2;

Fig. 4 is an exploded view in perspective showing complementary elements of the cage or jacket structure;

Figure 1:
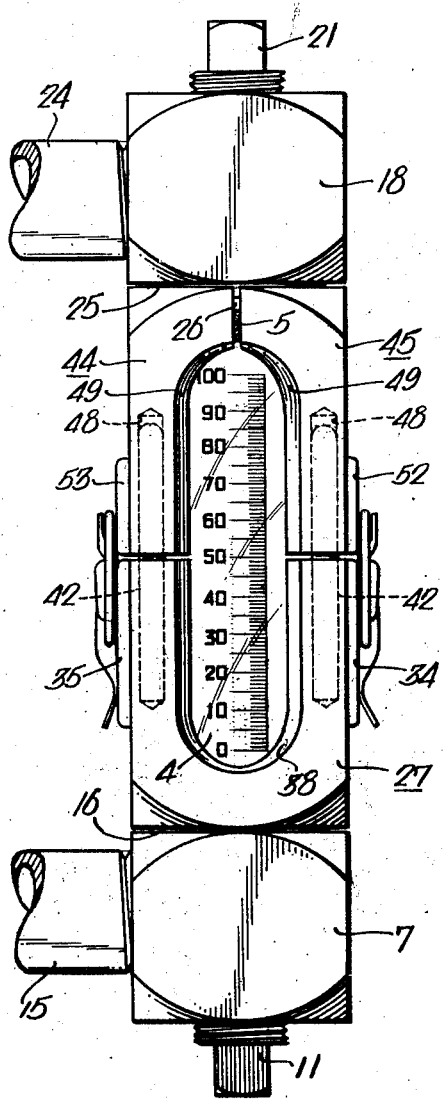
Fig. 1 is a front elevational view of a rotameter assembly made in accordance with the invention.
Figure 2:
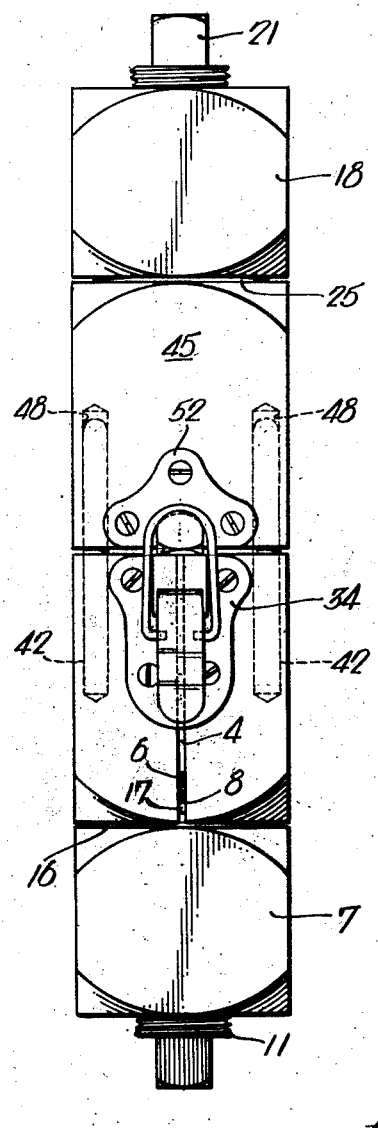
Fig. 2 is a side elevational view of the assembly.

With reference to Figs. 1 to 4 inclusive, the rotameter assembly therein illustrated as an embodiment of my invention comprises a flow tube 1 of glass or transparent plastic having the typical longitudinally tapered form; and a float 2 which coacts with the flow tube 1 in well known manner to afford the required flow measurements. In the present instance the float 2 is guided in its movement in the tube by a guide rod 3 which extends centrally and longitudinally of the tube and which is supported by means hereinafter described.

The rotameter assembly further comprises a protective tube or casing 4 of glass or plastic, transparent or otherwise, which embraces the flow tube 1 but which is somewhat shorter than that tube 1 so as to provide for engagement of the ends of the tube 1 by a pair of packing elements 5 and 6. These elements 6 are of annular form and closely embrace the outer surface of the tube 1 at the opposite ends of the latter, as best shown in Fig. 3. As also shown in this figure the opposite ends of the cylindrical casing 4 contact the confronting sides of the packing rings 5 and 6 respectively.

The tube 1 finds a seat upon a lower terminal member or fitting 7, a gasket 8 being interposed between the tube and the inner face of said member 7. The member 7 has a cylindrical bore 9 which, in assembly, aligns with the tube 1 and is in direct communication with the lower end of the latter. The lower or outer end of the bore 9 is threaded for reception of a plug 11 which closes the lower end of the bore and this plug is provided with a recess 12 which neatly receives the lower end of the guide rod 3. In the present instance the lower end of the rod 3 is embraced by a sleeve 13 which seats against the inner face of the plug 11 and forms a stop to limit the downward movement of the float 2 in the tube 1 and bore 9. The member 7, which is substantially rectangular in form, has in one side thereof an opening 14 which is tapped for reception of the threaded end of a pipe 15 constituting an element of the system in which the rotameter may be installed. The member 7 has at its upper end a recess 16 which extends completely around the upper end of the fitting in a plane normal to the longitudinal axis of the bore 9, the cylindrical bottom of said recess being coaxial with the bore 9. A radially projecting terminal flange 17 at the upper end of the said member forms one side wall of the recess 16. The function of the recess and flange will be described hereinafter.

A corresponding terminal member or fitting 18 is provided at the upper end of the assembly, this member having a central bore 19 which aligns with the tube 1 and which is closed at the upper end by means of a screw plug 21 corresponding to the plug 11 at the lower end of the assembly. Like the plug 11, the plug 21 has a recess 22 in its inner face which receives the upper end of the guide rod 3 whereby the rod is held accurately in coaxial relation with and in the flow tube 1. The member 18 has in one side thereof a tapped opening 23 which receives the threaded end of a pipe 24 constituting an element of the fluid system in which the rotameter may be installed. Adjacent its lower end the member 18 is provided with a recess 25 which extends completely around the member in a plane normal to the axis of the bore 19 and which has a cylindrical bottom coaxial with the said bore. As in the case of the recess 16 of the member 7, the recess 25 defines the inner side of a radially projecting terminal flange 26 at the lower end of the member 18.

In assembly the upper end of the tube 1 is embraced by the terminal flange portion of the member 18 and the outer surface of the flange 26 seats against the packing ring 5. At the opposite end of the cylindrical casing 4 the packing ring 6 finds a seat upon the upper face of the terminal flange 17 of the member 7, the said ring contacting the outer face of the gasket 8.

The assembly also includes an outer cage or jacket consisting of the elements shown in Fig. 4. In effect this cage consists of three parts of which one is indicated by the reference numeral 27. This member is externally of rectangular form corresponding dimensionally with the terminal members 7 and 18 described above and having an inner cylindrical bore 28 which in assembly embraces the lower part of the casing 4. At its lower end the bore 28 terminates at an inturned flange 29 which in assembly projects into the recess 16 of the member 7, as best illustrated in Fig. 3, and which thereby engages behind the terminal flange 17 of that member, the inner surface of the flange 29 being cylindrical and conforming dimensionally with the cylindrical bottom of the recess 16. The terminal opening at the bottom of the cage member which is defined by inner cylindrical surface of the flange 29 is designated by the reference numeral 31. In this manner the cage member 27 is interlocked with the member 7 for a purpose hereinafter described.

Two opposite walls 32 and 33 of the member 27 have secured thereto clamp elements, designated generally by the reference numerals 34 and 35; and the other side walls 36 and 37 of the member are cut away longitudinally, as indicated at 38 and 39 respectively, to provide openings through which in assembly the tubular casing 4 is exposed. At each corner of the upper terminal surface 41 of the member 27 a pin 42 projects parallel to the sides of the member and normal to the plane of the said terminal surface 41. It will be noted that the body of the member 27 is composed of two separate parts which are separated by a longitudinal slot 43 and which are held together in fixed relation but detachably by the elements of the clamps 34 and 35.

The cage further comprises the elements 44 and 45 shown at the top of Fig. 4. These two elements constitute the halves of the upper portion of the cage and jointly form a cage end section corresponding in form to the member 27. Each of the members has at its upper end an inturned terminal flange, 46 and 47 respectively, which in assembly projects into the recess 25 of the member 18 and engages behind the terminal flange 26 as shown in Fig. 3 to interlock the elements 44 and 45 with the member 18 for the purpose set forth below. At the lower ends the elements 44 are provided with longitudinal bores 48, one at each corner, which in assembly receive the pins 42 of the member 27 wherein the three parts are united into a unitary cage structure which once assembled holds flanges 46, 47 and 29 unyielding in recesses 25 and 16. Complementary recesses 49, 49 in the opposite sides of each of the members 44 and 45 form openings in the sides which correspond to and register with the openings 38 and 39 in the sides of the member 27 so that these openings in effect extend substantially the full length of the cage and expose a corresponding portion of the cylinder 4.

Each of the sections 44 and 45 has attached to the unrecessed wall 51 thereof a clamping element, 52 and 53 respectively, and in assembly these elements cooperate respectively with the clamping elements 34 and 35 on the member 27 to unite the sections longitudinally. These clamps are of well known type which function by toggle action to draw the sections 44 and 45 and the section 27 together so that the terminal member 18 moving as a unit with the sections 44 and 45 is drawn tightly down against the packing member 5 which in turn creates pressure forcing the cylinder 4 downwardly against the packing member 6 and the latter against the opposed face of the terminal member 7. By this action, made possible by the aforesaid interlocked relation between the cage sections 44—45 and 27 and the terminal members 18 and 7, the packing members 5 and 6 are expanded radially so as to bear tightly against the outer face of the flow tube 1 and the inner faces of the cage structure described above. The several elements of the assembly are in this manner secured together in a rigid unitary assembly wherein the joints between the flow tube 1 and the terminal members 7 and 18 are effectively sealed by the expanded resilient packing rings 5 and 6. These rings also effectively seal the joints between the ends of the casing member 4 and the said terminal members 7 and 18 and it will be noted that the action is such that the cylindrical member 4 functions in effect as a gland or follower to forcibly expand the packing element 6 in the stuffing box formed between the wall of the tube 1, the end surface of the terminal member 7 and the wall of the cage. The terminal flange 26 of the member 18 functions also in the capacity of a gland to expand the packing member 5 in the stuffing box formed by the wall of the tube 1, the embracing wall of the cage and the upper end of the cylinder 4. The glands are actuated to compress the packing by means of the clamps 34—52 which draw the parts of the cage together and which by reason of the interlocked connection between the elements of the cage and the members 7 and 18 act in effect to draw the member 18 downwardly against the packing 5 and the packing 5 against the top of the cylinder 4. It will be noted that the upper portion of the cage consisting of the elements 44 and 45 is divided along a plane at right angles to the plane of the slot 43 of the lower member 27 of the cage.

The aforedescribed construction confers certain highly desirable characteristics upon the rotameter assembly. Each of the terminal members 7 and 18, for example, may be adjusted with respect to the body of the rotameter through an angle of 360 degrees about the longitudinal axis of the tube 1. This affords a high degree of flexibility in mounting the rotameter in the fluid system of which it is to form a part. By use of the quick acting clamps 34—52 and 35—53 and the pins 42 the necessity for tie-rods and like threaded elements has been eliminated and the operations of assembly and disassembly are greatly facilitated. The casing cylinder 4, which may be made of glass or other suitable transparent material, affords a high degree of protection for the flow tube 1 without interfering with the visibility of the tube, and the manner in which this tube is associated with the other elements of the structure materially simplifies the means for sealing the flow tube 1 in the structure. The construction also utilizes the terminal members 7 and 18 and the casing 4 as functional elements of the stuffing boxes which are required to properly seal the flow tube 1 in the duct system, with resultant material simplification. The armored cage or jacket not only provides the necessary rigidity to the frame structure, but also constitutes a functional part of the sealing means, and the construction of the cage is such as to materially facilitate the operations of assembly and disassembly.

It will be noted that the two parts of the lower member 27 of the cage will be assembled with the lower terminal member 7 prior to attachment of the clamps 34 and 35 which, as previously described, function to secure the two halves of the casing member 27 together. Assembly of the upper portion of the cage is effected by first applying the two cage halves 44 and 45 to the upper terminal member 18 and thereafter inserting the pins 42 in the recesses 48 to unite the members 44 and 45 with the lower member 27, the pins 42 then functioning to hold the upper elements 44 and 45 in their subassembled relation with the member 18 and to prevent relative angular movements between the cage sections about the longitudinal axis of the cage. The upper and lower packing rings 5 and 6 and the intervening cylinder 4 may be assembled with the flow tube 1 and inserted in the lower member 27 of the cage structure prior to connecting the latter with the sub-assembly consisting, as described above, of the two upper elements 44 and 45 of the cage and the upper terminal member 18. Access may be had to the interior of the flow tube 1 after assembly for cleaning purposes or for removal of the guide rod 3 and the float 2 by removal of the plugs 11 and 21.

Additionally, the cage or jacket is of a character permitting ready production thereof by machining from bar stock so that castings are avoided. It will be apparent that the tube 1 and the guide rod 3 may be replaced by other forms of flow tube or by tubes utilizing other float guiding means, such, for example, as integral ribs projecting from the inner tapered surface of the tube.

Figure 7:
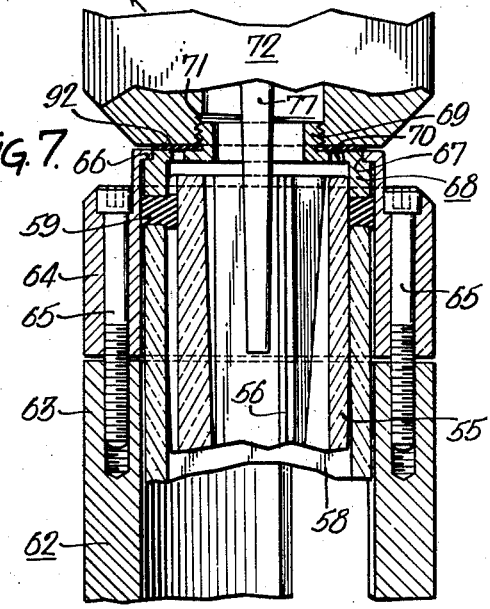
Fig. 7 is a fragmentary section on the line 7—7, Fig. 6.
Figure 8:
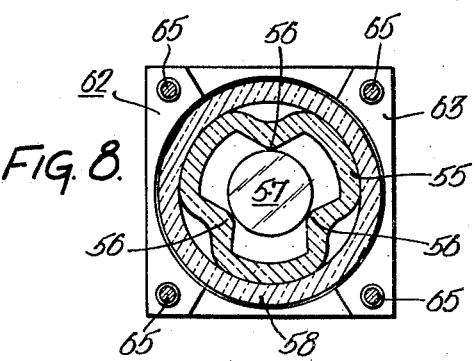
Fig. 8 is a sectional view on the line 8—8, Fig. 5.

The embodiment of the invention illustrated in Figs. 5 to 8 inclusive differs in certain details from that described above. The flow tube, identified in this instance by the reference numeral 55, is of a type containing internal ribs 56 as guides for the float 57. The tube 55 is surrounded by an outer casing tube 58 of glass or other suitable transparent material and the opposite ends of the cylinder 58 seat against upper and lower packing rings 59 and 61 respectively. As in the previous embodiment, an outer cage or jacket 62 is provided which comprises a lower portion 63 and an upper portion 64. In this case the portions 63 and 64 are secured together by means of screws 65. The upper end of the upper portion 64 of the cage is provided with an inturned flange 66 (see Fig. 7) which engages behind a shoulder 67 of an annular member 68, the lower end of which in assembly seats against the packing ring 59, and the member 68 also comprises an outwardly extending threaded neck 69 which in assembly is threaded into a tapped opening 71 in an upper terminal member 72, as shown in Fig. 7. The member 68 is provided with holes 70 for engagement by a suitable wrench to facilitate assembly and disassembly of this member with the terminal member 72. This terminal member is provided at one side with a tapped opening 73 for connection to a system pipe 74. The outer end surface of the member 72 is also provided with a tapped opening 75 which is normally closed by a screw plug 76, this plug in the present instance having an inward axial extension 77 which functions as an upper limit stop for the float 57.

The lower end of the lower cage member 63 is also provided with an inturned flange 78 which engages behind a shoulder 79 of an annular member 81 corresponding to the member 68 described above. The inner surface of the member 81 forms a bearing for the lower end of the flow tube 55 and a suitable gasket 82 is provided between the end of the tube and the opposed surface of the annular member. This member also forms a seat for the lower packing ring 61.

Figure 5:
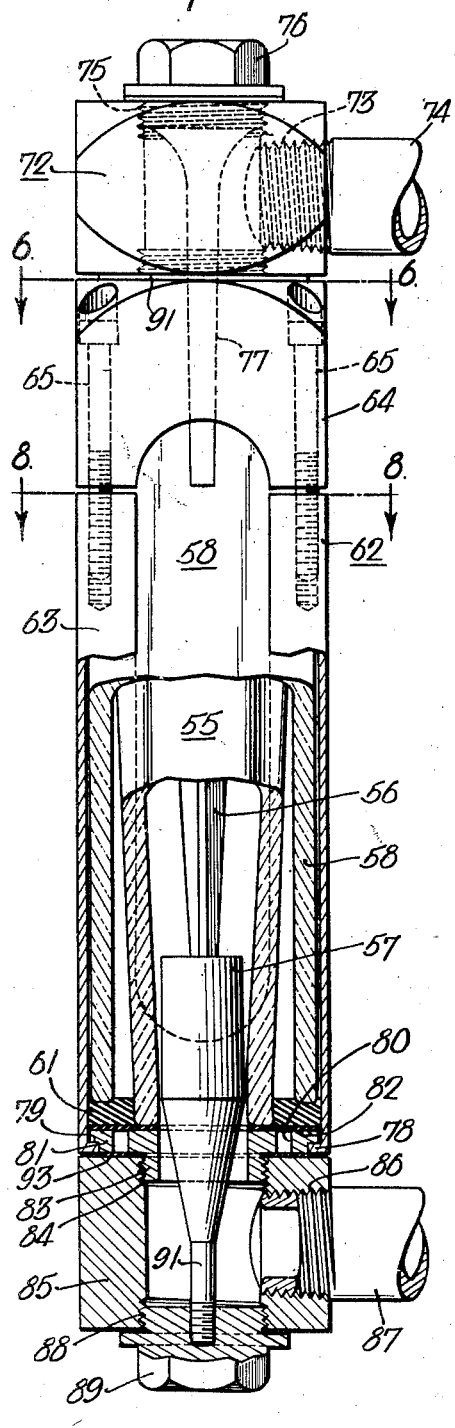
Fig. 5 is an elevational and partial sectional view illustrating a modified form of assembly.
Figure 6:
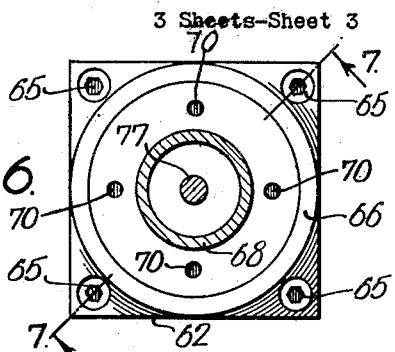
Fig. 6 is a section on the line 6—6, Fig. 5.

The member 81 is provided with a threaded neck 83 which is adapted to enter a tapped aperture 84 in a lower terminal member 85 and to thereby secure the terminal member in the rotameter structure. Wrench holes 80 are provided in the member 81 corresponding to the holes 70 in the member 68. This member 85 has a tapped opening 86 in one side wall thereof for connection with a system pipe 87. The member 85 also has a tapped opening 88 in the outer end thereof which is normally closed by a screw plug 89, and threaded into the inner side of the plug 89 is a pin 91 which forms a lower limit stop for the float 57, as shown in Fig. 5.

In assembling the above described rotameter structure the sealing rings 59 and 61 are applied to the ends of the flow tube 55 with the protective cylindrical casing 58 in place between the said rings. The lower annular member 81 is inserted in the bottom of the lower portion 63 of the cage and the subassembly consisting of the flow tube 55, outer tube 58 and packing rings 59 and 61 then inserted to rest upon the annular member 81 within the lower cage section. The lower terminal member 85 may then be threaded onto the neck 83 of the annular member 81. The annular member 68 is then inserted in the upper cage member 64 and the upper terminal member 72 threaded to the neck 69 of the member 68. Thereafter the upper cage member 64 may be attached to the lower cage member by means of the screws 65. When the screws are tightened the annular member 68 is drawn downwardly with the upper cage member 64 against the packing ring 69, the pressure being applied through this ring to the cylinder 58 which in turn is pulled downwardly against the lower packing ring 61. The packing rings are thereby expanded between the wall of the flow tubes 55 and the opposed wall of the cage so that a tight seal is effected at both ends of the flow tube and between the flow tube and the annular members 68 and 81. The joints between the terminal members 72 and 85 and the respective annular members 68 and 81 are sealed by suitable gaskets 92 and 93 respectively.

It will be apparent that this embodiment of the invention possesses many of the desirable characteristics of the previously described embodiment.

I claim:

1. In a protective structure for the fragile transparent tubes of gauges and the like, the combination with such tube of a flexible sealing ring embracing each end of said tube, a transparent tubular casing surrounding the tube and confined between said rings, a terminal fitting at each end of the tube abutting the outer end faces of the respective rings, a cage embracing the casing and having side ports through which the casing is visible, said cage comprising separable end sections relatively movable longitudinally of the casing, means for preventing relative angular movements between the cage sections about the longitudinal axis of the cage, means for detachably interlocking each of the terminal fittings with the proximate cage section for movement with the latter as a unit in the said longitudinal direction, and means for forcibly drawing the said sections toward each other so as to compress the sealing rings between the terminal fittings and the respective proximate ends of the casing thereby to expand the rings into firm sealing engagement with the outer surface of the tube.

2. A structure according to claim 1 wherein the means for preventing relative angular movements between the cage sections consists of pins projecting from one of said sections parallel to the said casing axis, and sockets in the other of said sections having a close-sliding fit with said pins.

3. A structure according to claim 2 wherein each of said cage sections comprises two separable longitudinal complementary parts, said structure including also means for detachably securing together the complementary parts of one of said cage sections to form a rigid unit, and the said pins guiding the complementary parts of the said other case section in the said drawing movement and, with said drawing means, forming the said cage sections and the complementary parts thereof into a rigid self-contained unit.

4. A structure according to claim 3 wherein the said means for drawing the cage sections together includes an element mounted on each of two opposite sides of the unitary section and separate elements on the respective parts of the other cage section forming complementary pairs respectively with the elements on the unitary section, a pivoted lever on one of the complementary elements of each pair, and a bail on each lever for interlocking engagement with the other element of said pair.

5. A structure according to claim 3 wherein each of the cage sections has an inturned peripheral flange and the said terminal fittings have peripheral recesses for reception of said flanges to interlock the fittings with the respective cage sections in direction longitudinally of the casing while permitting angular adjustment of the fittings with respect to the cage about the longitudinal axis of the latter.

FREDERICK BOEHM.

References Cited in the file of this patent

UNITED STATES PATENTS

| Number | Name | Date |
|---|---|---|
| 1,110,974 | Buskirk et al. | Sept. 15, 1914 |
| 2,370,634 | Brewer | Mar. 6, 1945 |
| 2,426,393 | Fischer | Aug. 26, 1947 |
| 2,475,630 | Melas et al. | July 12, 1949 |